United States Patent [19]

Oshima et al.

[11] 3,919,630

[45] Nov. 11, 1975

[54] FLUX DETECTION DEVICE USING A PARAMETRICALLY EXCITED SECOND HARMONIC OSCILLATOR

[75] Inventors: Shintaro Oshima, Musashino; Teruji Watanabe, Niza; Takasuke Fukui, Tokyo, all of Japan

[73] Assignee: Kokusai Denshin Denwa Kabushiki Kaisha, Japan

[22] Filed: Oct. 2, 1972

[21] Appl. No.: 294,497

Related U.S. Application Data

[63] Continuation-in-part of Ser. No. 96,190, Dec. 8, 1970, abandoned.

[30] Foreign Application Priority Data

Dec. 10, 1969 Japan .............................. 44-98637

[52] U.S. Cl. .............................................. 324/43 R

[51] Int. Cl.$^2$ .......................................... G01R 33/02

[58] Field of Search .................. 324/43 R, 47, 43 G; 307/88 P, 88 TF

[56] References Cited

UNITED STATES PATENTS

| | | | |
|---|---|---|---|
| 3,239,754 | 3/1966 | Odom, Jr. et al. | 324/47 |
| 3,440,436 | 4/1969 | Oshima et al. | 307/88 P |
| 3,718,872 | 2/1973 | Takeuchi | 324/43 R |

FOREIGN PATENTS OR APPLICATIONS

| | | | |
|---|---|---|---|
| 4,535,595 | 11/1970 | Japan | 324/43 R |

OTHER PUBLICATIONS

Oshima et al., High Sensitivity Plated-Wire Sensor Using Second Harmonic Oscillation and Its Applications, IEEE, Trans. on Magnetics, Sept. 1971, pp. 436–437.

Morris et al., Design of a Second Harmonic Fluxgate Magnetic Field Gradiometer, Rev. of Scien. Inst., Vol. 32, No. 4, pp. 444–448, April, 1961.

Wang, C., C., Parametric Phase Locked Circuit, IBM Tech. Bull., Vol. 8, No. 1, June 1965, pp. 140–141.

*Primary Examiner*—Robert J. Corcoran
*Attorney, Agent, or Firm*—Robert E. Burns; Emmanuel J. Lobato; Bruce L. Adams

[57] ABSTRACT

This disclosure is a flux detection device comprising a parametrically excited second harmonic oscillator developing an output signal having two possible oscillatory phases, and in which the oscillator comprises two magnetic sensors each comprising a straight conductor and a cylindrical ferromagnetic thin film coated on the straight conductor so as to have a circumferential easy magnetization direction and arranged substantially in parallel, inductance means comprising two inductors respectively wound insulatively on the two magnetic sensors and connected differentially in series for an external magnetic field, means for flowing an exciting current to the two magnetic sensors connected in series, and a capacitor connected in parallel with the inductance means to form a parallel resonance circuit for the second harmonic of the exciting current, so that the oscillatory phase can be reversed by a very small external magnetic field which is non-uniformly effective to the two magnetic sensors.

6 Claims, 9 Drawing Figures

FLUX DETECTION DEVICE USING A PARAMETRICALLY EXCITED SECOND HARMONIC OSCILLATOR

This application is a continuation-in-part of our copending application, Ser. No. 96,190, filed on Dec. 8, 1970, and now abandoned.

This invention relates to a magnetic flux detection device using a parametrically excited second harmonic oscillator which is formed by utilizing a non-linear characteristic of a magnetic sensors comprising a straight conductor and cylindrical ferromagnetic thin film coated on the straight conductor.

Inventors have proposed an example of the detection device of a magnetic field of this type in a Japanese patent application No. 31,358/1974 published on Aug. 21, 1974 and on which Pat. No. 585,574 has issued. However, it is very difficult to detect a small magnetic field without effect of an external uniform magnetic field on the conventional device.

An object of this invention is to provide a detection device of a non-uniform magnetic field using a parametrically excited second harmonic oscillator detectable of a small magnetic field under the effect of an external uniform magnetic field.

The principle of this invention will be understood from the following detailed discussion taken in conjunction with accompanying drawings, in which the same or equivalent parts are designated by the same reference numerals, characters and symbols, and in which.

Figure 1:
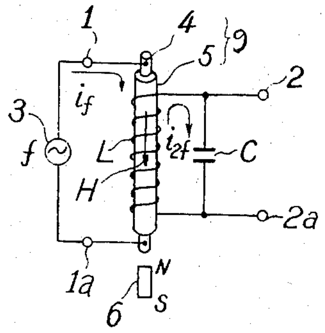
FIG. 1 is a connection diagram explanatory of the principle of a parametrically excited second harmonic oscillator used in the detection device of this invention.
Figure 2:
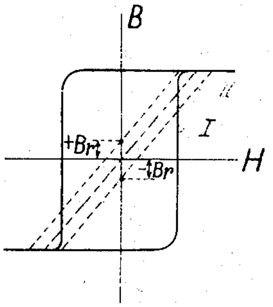
FIG. 2 is a diagram of a characteristic curve illustrating a magnetic hysteresis characteristic of a magnetic sensor to be employed in the parametrically excited second harmonic oscillator shown in FIG. 1.

For readily understanding this invention, the principle of a parametrically excited second harmonic oscillator will first be described. With reference to FIG. 1, a second harmonic oscillator employed in this invention comprises a magnetic sensor 9 comprising a straight conductor 4 and a cylindrical ferromagnetic thin film 5 (e.g.; permalloy) coated on the conductor 4 by electroplating or evaporative deposition, an inductor L wound insulatively on the magnetic sensor 9, and a capacitor C connected in parallel with the inductor L. A source 3 generates an excitation current of frequency $f$ to be applied to the conductor 4 across terminals 1 and 1$a$. The inductor L and the capacitor C form a parallel resonance circuit resonant at a frequency $2f$ which is the second harmonic of the excitation signal of frequency $f$. Terminals of the capacitor C are output terminals 2 and 2$a$ of the parallel resonance circuit. In this circuit, if the ferromagnetic thin film 5 has an easy magnetization direction along the circumferential direction of the magnetic sensor 9 (i.e.; perpendicular to the axis of the magnetic sensor 9), respective magnetization characteristics along the easy magnetization direction and the hard magnetization direction are indicated by hysteresis curves I and II in FIG. 2. If the ferromagnetic thin film 5 has ideal anisotropy, no hysteresis loop is obtained in the hard direction as shown by a chain line in FIG. 2. However, a small residual magnetic induction +Br or −Br is generally obtained along the hard direction in an actual case.

In operation, if an excitation current $i_f$ is flowed from the source 3 across the terminals 1 and 1$a$ of the conductor 4, an inductance of the inductor L viewed from the terminals 2 and 2$a$ assumes a non-linear inductance having frequency components $2f$ and other harmonics of even number order under a condition of a sufficiently large value of the excitation current $i_f$. If it can be now assumed that there is no current in the resonance circuit and no magnetic field in the hard magnetization direction of the magnetic sensors, no voltage is generated in this resonance circuit since an interlinking component of the flux to the resonant coil has not appeared.

However if a magnetic field is applied along the axis of the magnetic sensor (e.g. the hard direction), a voltage of double the frequency f having a phase "O" or "$\pi$" in accordance with direction of the applied magnetic field is generated in the resonance circuit. Application of this magnetic field along the axis of the magnetic sensor 9 can be performed by making approach a small magnet 6 near either one of two ends of the magnetic wire 9. In any case, the oscillatory phase of the voltage of the second harmonic is controlled in accordance with the direction of the magnetic field applied in the axis of the magnetic sensor 9.

The intensity of the magnetic field necessary to reverse the oscillatory phase of the second harmonic oscillator is significant for determining the sensitivity of this detection device. In the following, the intensity of the magnetic field necessary to reverse the oscillatory phase of the second harmonic oscillator will be described with respect to both continuous excitation and intermittent or quenched excitation. In response to excitation current $i_f$ and any dc perterbation components flowing through the magnetic sensor 9, an ac magnetic field of ac component ($i_{2f}$) and a dc magnetic field $H_b$ are caused by a non-linear characteristic of the inductor L. In a case where the excitation current $i_f$ flows continuously, the oscillatory phase is switched from a phase 0 to phase $\pi$ or a phase $\pi$ to a phase 0, if appropriate magnetic field substantially larger than the resultant magnetic field of the ac magnetic field of the oscillatory current ($i_{2f}$) and a dc magnetic field $H_b$ is applied in a direction reverse to that of the resultant magnetic field. On the other hand, in a case where the excitation current $i_f$ flows intermittently, the oscillatory phase is determined by a polarity of the resultant magnetic field which is obtained from the external magnetic field applied in the axis of the magnetic sensor and the residual magnetic field corresponding to the residual magnetic flux in the hard magnetization direction.

Accordingly, a magnetic field necessary to reverse the oscillatory phase caused by the intermittent excitation current is smaller than that necessary in the case of continuous excitation.

Figure 3A:
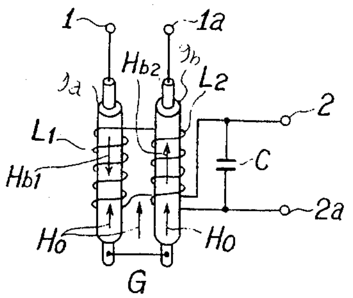
FIGS. 3A and 3B are connection diagrams each illustrating an example of this invention.
Figure 3B:
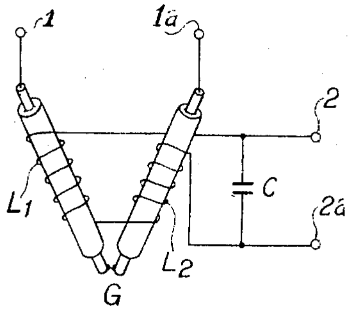

With reference to FIG. 3A, an example of this invention comprises two magnetic sensors 9$a$ and 9$b$ arranged substantially in parallel and connected to each other at respective one ends, excitation terminals 1 and 1*a* provided at respective other ends of the magnetic sensors 9 and 9*a* to flow an excitation current of frequency *f*, inductors $L_1$ and $L_2$ wound insulatively on the magnetic sensors 9*a* and 9*b* respectively and connected in series to each other, a capacitor C connected in parallel with a series connection of the inductors $L_1$ and $L_2$, and output terminals 2 and 2*a* provided at two terminals of the capacitor C. Each of the two magnetic sensors 9*a* and 9*b* comprises a straight conductor and cylindrical ferromagnetic thin film coated on the straight conductor. The inductors $L_1$ and $L_2$ have the same number of turns and are connected in series under any one of the following conditions: (i) two inductors $L_1$ and $L_2$ have the same winding direction and connected in the opposite sense to each other, and (ii) two inductors $L_1$ and $L_2$ have the opposite winding direction to each other and connected in the same sense. At any rate, voltages induced across the two inductors $L_1$ and $L_2$ by the effect of an external uniform magnetic field Ho such as the earth magnetic field, are counterbalanced at the output terminals 2 and 2*a* under any one of the above mentioned conditions. It is desirable that the two inductors $L_1$ and $L_2$ have the same geometric dimension and formation. However, the arrangement of the two inductors $L_1$ and $L_2$ need not be parallel as shown in FIG. 3B in an exaggerated illustration. The capacitor C and a resultant inductance of the two inductors $L_1$ and $L_2$ form a parallel resonance circuit for the frequency 2*f*, so that this resonance circuit develops a second harmonic oscillation of a phase 0 or $\pi$ due to non-linear characteristic of the resultant inductance of the two inductors $L_1$ and $L_2$ if an excitation current of frequency *f* flows in the magnetic sensors 9*a* and 9*b*.

If the excitation current of frequency *f* flows continuously, a magnetic field necessary for reversing the oscillatory phase of the resonance circuit is a magnetic field of opposite direction having an intensity which is larger than that of a difference between respective resultant values of magnetic fields respectively along the axes of the magnetic sensors 9*a* and 9*b* caused by the oscillatory current of frequency 2*f*, the external non-uniform magnetic field on the inductors $L_1$ and $L_2$, and the dc magnetic fields Hb1 and Hb2 caused by the oscillatory current of frequency 2*f* in the non-linear inductors $L_1$ and $L_2$.

On the other hand, if the excitation current of frequency *f* flows intermittently, the oscillatory phase is determined by the polarity of the resultant magnetic field in accordance with a "difference" between respective resultant values of an external non-uniform magnetic field to be detected on the inductors $L_1$ and $L_2$, and residual magnetic inductions of the inductors $L_1$ and $L_2$ at a time immediately preceding the application of the excitation current.

As understood from the above detailed discussion, a detection system of a magnetic field using a parametrically excited second harmonic oscillator provided in accordance with this invention can detect a very small difference between magnetic fields applied to respective sensors 9*a* and 9*b* or magnetic substances irrespective of the external uniform magnetic field.

Figure 4A:
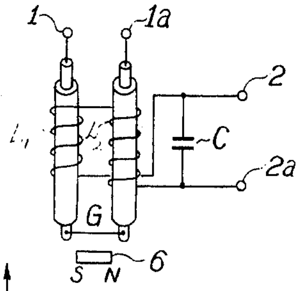
FIGS. 4A and 4B are respectively a connection diagram and time charts explanatory of reversal of the oscillatory phase in the device of this invention.
Figure 4B:
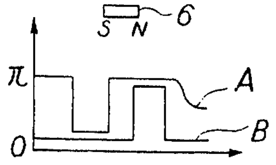

With reference to FIG. 4A and 4B, operation of the device shown in FIG. 3A in a case where a small magnet 6 moves near a detection portion G of this device in the direction perpendicular to the axis of the magnetic sensors 9*a* and 9*b* will be described. In general, the oscillation phase of a second harmonic component depends upon the polarity of the applied dc magnetic field. Therefore, if there is no dc magnetic field, the respective probabilities of assuming the phases 0 and $\pi$ of the second harmonic component should be equal. If it is now assumed that the resonance circuit generates an oscillation of the phase $\pi$, by way of example, that the magnet 6 moves from the left to right, and that the magnetization direction of magnetic flux generated from the magnet 6 is different from the magnetization direction of a resultant of the second harmonic ac magnetic field and the dc magnetic field developed in response to the excitation current and a dc perterbation current, the direction of the effective magnetic field applied in the axis of the magnetic sensors 9*a* and 9*b* is reversed when the magnet 6 approaches the lower end of the inductor $L_1$ so that the oscillatory phase is switched to the phase 0. This oscillatory phase 0 is reversed to the phase $\pi$ when the effect of the magnet 6 on the inductor $L_2$ is powerful in response to further movement of the magnet 6. Moreover, when the magnet 6 is further moved, the oscillatory phase of the resonance circuit is not changed at this time as illustrated by a curve A in FIG. 4B. A curve B is a characteristic of phase reversal in a case where the initial oscillatory resonance circuit is of the phase 0 so that the inductors $L_1$ and $L_2$ are magnetized in the directions respectively opposite to the directions as mentioned above.

In other words, since the intensity of the magnet 6 (magnetic flux generator) effective to the inductors $L_1$ and $L_2$ varies in accordance with the position of the magnet 6, the oscillatory phase of the resonance circuit changes along the curve A or the curve B in accordance with the initial oscillatory phase $\pi$ or 0. In this case, the magnetized direction of the magnet 6 may be arranged (i) in a direction perpendicular to the axis of the magnetic sensors 9*a* and 9*b* as shown in FIG. 4A, or (ii) in a direction along the axis of the magnetic sensors 9*a* and 9*b* while moving along a direction perpendicular to the axis of the magnetic wires 9*a* and 9*b*. In any case, similar curves A and B are obtained.

Figure 5A:
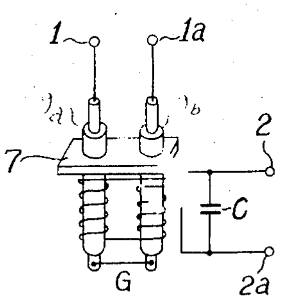
FIGS.5A and 5B are connection diagrams each illustrating an example of this invention having magnetic shield.
Figure 5B:
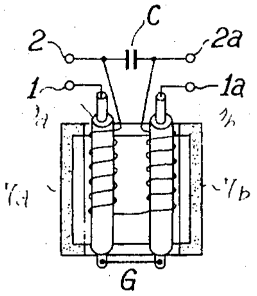

With reference to FIGS. 5A and 5B, examples of means for reducing the magnetic resistance in the device of this invention will now be described. With reference to FIG. 5A, a magnetic plate 7 having large permeability is arranged so as to connect magnetically between respective ferromagnetic thin films of the magnetic sensors 9*a* and 9*b* at the opposite ends to the detection portion G, so that the magnetic flux generated from the magnet 6 and applied from the detection portion G is sufficiently and effectively utilized to control the oscillatory phase of the resonance circuit. With reference to FIG. 5B, a cylindrical magnetic substance 7*a* is arranged at the outside of the magnetic sensors 9*a* and 9*b* so as to act as a yoke, so that the magnetic flux leaked at the outside of the magnetic sensors 9*a* and 9*b* is concentrated in this magnetic substance 7*a*. The arrangement shown in FIG. 5A is suitable for the arrangement (i) of the magnet 6, while the arrangement shown in FIG. 5B is suitable for the arrangement (ii) of the magnet 6. As the result of the above mentioned construction, the device of this invention is magnetically shielded at the end opposite to the detection portion G in the arrangement shown in FIG. 5A or at the sides of the magnetic sensors 9*a* and 9*b* in the arrangement shown in FIG. 5B. Moveover, if the whole part of the device except the detection portion G is covered by a magnetic substance similar to the magnetic substance 7a, directivity of detecting a magnetic field and a magnetic flux generator will be further sharpened.

Figure 6:
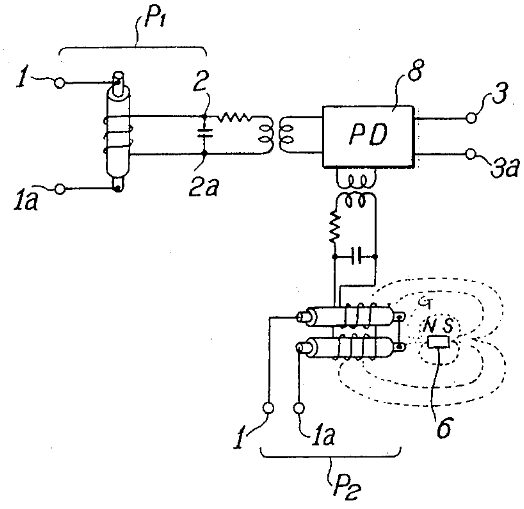
FIG. 6 is a connection diagram illustrating an actual application of the device of this invention to a magnetic field detection system.

With reference to FIG. 6, an actual application of the device of this invention to a phase detection system will now be described. This system comprises a parametrically excited second harmonic oscillator $P_1$ generating an oscillatory signal of a reference phase, a parametrically excited second harmonic oscillator $P_2$ of this invention as mentioned with reference to FIGS. 3A, 3B, 4A and 4B, and a phase detector 8. Respective excitation terminals 1 and 1a of the oscillators $P_1$ and $P_2$ are connected in series to each other to form a series connection, and a continuous or intermittent excitation current of frequency $f$ is applied to this series connection of the excitation terminals 1 and 1a. Accordingly, the second harmonic oscillators $P_1$ and $P_2$ are oscillated in appropriate oscillatory phases respectively. Respective outputs of the second harmonic oscillators $P_1$ and $P_2$ are applied to the phase detector 8, in which a phase difference between the respective outputs of the second harmonic oscillators $P_1$ and $P_2$ is detected. Accordingly, if the respective oscillatory phases of the second harmonic oscillators $P_1$ and $P_2$ are the same, a dc voltage is obtained across the output terminals 3 and 3a of the phase detector 8. However, if the oscillatory phase of the second harmonic oscillator $P_2$ is reversed by approaching a magnetic flux generator 6 to the detection portion G, the dc output of the phase-detector 8 is not obtained. Accordingly, the oscillatory phase of the second harmonic oscillator $P_2$ can be controlled by existance and non-existance of the magnetic flux generator 6. As understood from the above, the phase-relationship between the second harmonic oscillators $P_1$ and $P_2$ can be digitally indicated by the use of the output of the phase-detector 8.

As mentioned above, a detection device of a magnetic field using a parametrically excited second harmonic oscillator of this invention comprises two magnetic sensors having circumferential easy magnetization directions and arranged substantially in parallel, two inductors wound respectively on the two magnetic sensors and connected differentially in series in view of respective effects of resultant magnetic fields on the magnetic sensors along the axis of the magnetic sensors, and a capacitor connected in parallel with the series connection of the two inductors to form a parallel resonance circuit which tunes with a second harmonic component of an excitation current applied to the magnetic sensors. According to the above construction, a detection system of a magnetic field having high sensitivity and high resolving power can be provided in accordance with this invention in the presence of a uniform magnetic field.

What we claim is:

1. A flux detection device for detecting a non-uniform magnetic field comprising a parametrically excited second harmonic oscillator comprising:

two magnetic sensors each comprising a straight electrical conductor having a ferromagnetic thin film coated circumferentially and axially on the respective straight conductor so as to have a circumferential easy magnetization direction means connecting the conductors of said two magnetic sensors in series;

inductance means comprising two inductors each having an equal number of turns wound insulatively circumferentially on a respective one of the two magnetic sensors and connected differentially in series for detecting an external non-uniform magnetic field;

means for applying an exciting current to the conductors of the two magnetic sensors connected in series;

a capacitor connected in parallel with the two inductors to form a parallel resonance circuit having a resonance frequency equal to a second harmonic frequency of the frequency of the exciting current for developing a second harmonic component therein having either one of two possible phases in accordance with the existence or non-existence of a magnetic field nonuniformly effective on said two magnetic sensors; and detection means coupled to said resonance circuit for detecting the oscillatory phase of the second harmonic component which is generated in the resonance circuit.

2. A flux detection device according to claim 1, in which the inductors are wound on the two magnetic sensors in the same winding direction and connected in series in an opposite sense.

3. A flux detection device according to claim 1, in which the inductors are wound on the two magnetic sensors in opposite winding direction and connected in series in a same sense.

4. A flux device according to claim 1, including shield means provided for magnetically shielding the sides of the two magnetic sensors except one end of each of the two magnetic sensors.

5. A flux detection device according to claim 1, in which a magnetic substance magnetically connects the ferromagnetic thin films of the magnetic sensors at one end of the two magnetic sensors and said means connecting the conductors of said two magnetic sensors in series is at the opposite end of the sensors.

6. A flux detection device according to claim 1, in which said magnetic sensors are disposed substantially parallel.

* * * * *